United States Patent
Chang

(10) Patent No.: US 8,724,221 B2
(45) Date of Patent: May 13, 2014

(54) OPTICAL INTERFERENCE BANDPASS FILTER

(75) Inventor: Yi-Sheng Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 158 days.

(21) Appl. No.: 13/166,551

(22) Filed: Jun. 22, 2011

(65) Prior Publication Data
US 2012/0327515 A1    Dec. 27, 2012

(51) Int. Cl.
*G02B 5/28* (2006.01)
*G02B 1/10* (2006.01)
*G02B 1/11* (2006.01)

(52) U.S. Cl.
CPC ............... *G02B 5/288* (2013.01); *G02B 5/285* (2013.01); *G02B 1/115* (2013.01)
USPC ............................ 359/589; 359/586; 359/588

(58) Field of Classification Search
USPC .................... 359/577–579, 580–590
See application file for complete search history.

(56) References Cited

U.S. PATENT DOCUMENTS

| | | | | |
|---|---|---|---|---|
| 5,999,322 A | * | 12/1999 | Cushing | 359/589 |
| 6,018,421 A | * | 1/2000 | Cushing | 359/589 |
| 2005/0280896 A1 | * | 12/2005 | E Shang | 359/580 |
| 2006/0018022 A1 | * | 1/2006 | Shang | 359/589 |
| 2007/0109649 A1 | * | 5/2007 | Chen E. Shang | 359/588 |

* cited by examiner

*Primary Examiner* — Alicia M Harrington
*Assistant Examiner* — Cara Rokowski
(74) *Attorney, Agent, or Firm* — Tracy M. Heims; Apex Juris, pllc

(57) ABSTRACT

An optical filter includes a substrate and a filter film attached on the substrate. The filter film has alternate layers of high reflective layers and low reflective layers to form a plurality of Fabry-Perot resonators. A basic optical thickness of the high reflective layers and the low reflective layers is one fourth a central wavelength ($\lambda_0/4$) of incident ray, and each of the Fabry-Perot resonators has two high reflector films and a spacer between the high reflector films. The spacers in the Fabry-Perot resonator, which is most proximal to the substrate, and in the Fabry-Perot resonator, which is most distal to the substrate, have an optical thickness respectively in a range between four times the basic optical thickness and fourteen times the basic optical thickness.

9 Claims, 3 Drawing Sheets

OPTICAL INTERFERENCE BANDPASS FILTER

BACKGROUND OF THE INVENTION

1. Field of the Invention

The present invention relates generally to an optical device, and more particularly to an optical filter used in coarse wavelength division multiplexing (CWDM).

2. Description of the Related Art

In fast development of computer and network, people may obtain data through internet in an easy and fast way. The photoelectric communication provides a fast and mass data transmission therefore optoelectronic industry becomes more and more important. In optoelectronic field, the fast improvement is the combination of electronics and optics, and optical networking is the one we want to develop first.

The optical networking is a technique using optical fiber to be the communicating media of data transmission to transmit analog or digital data through laser ray between different systems, such as computer system and telephone system. The laser ray has a frequency higher than the electric wave, and the lost of laser ray in the optical fiber is very little that it has higher transmission speed and efficiency than any conventional communication system.

Coarse wavelength division multiplexing (CWDM) is a very common technique in optical networking which has a filter film and a multiplexer to integrate various channels with different frequencies in single optical fiber, and separate the different wavelength into plural optical fibers at receive end by a demultiplexer. The filter film of CWDM has Fabry-Perot resonators, each of which includes plural high reflective layers and low reflective layers stacked together. The following is a sample of the sequence of the high and low reflective layers of the filter film of CWDM in sequence from an air side (Air) to a substrate side (Ns):

Air/H(LH)^2 2L(HL)^3 H(LH)^3 4L(HL)^3 H(LH)^4 6L(HL)^4 H(LH)^3 6L(HL)^3 H(LH)^4 6L(HL)^4 H(LH)^3 6L(HL)^3 H(LH)^4 6L(HL)^4 H(LH)^3 4L(HL)^3 H(LH)^3 2L(HL)^2 H/Ns wherein: H indicates a high reflective layer with a basic optical thickness ($\lambda_0/4$); L indicates a low reflective layer with a basic optical thickness ($\lambda_0/4$); and $\lambda_0$ indicates central wavelength of incident rays.

With the filter as described above and the multiplexer it may integrate plural channels with different frequencies in single optical fiber.

However, as shown in FIG. 1, the filter as described above cannot reduce the stopbands of the channels. Each channel has a constant bandwidth, and the neighboring channels will interfere with each other when they have great stopbands that the communication quality of the optical networking will be decreased.

SUMMARY OF THE INVENTION

The primary objective of the present invention is to provide an optical filter, which may reduce the stopband of each channel.

To meet the primary objective, an optical filter includes a substrate and a filter film attached on the substrate. The filter film has alternate layers of high reflective layers and low reflective layers to form a plurality of Fabry-Perot resonators. A basic optical thickness of the high reflective layers and the low reflective layers is one fourth a central wavelength ($\lambda_0/4$) of incident ray, and each of the Fabry-Perot resonators has two high reflector films and a spacer between the high reflector films. The spacers in the Fabry-Perot resonator, which is most proximal to the substrate, and in the Fabry-Perot resonator, which is most distal to the substrate, have an optical thickness respectively in a range between four times the basic optical thickness and fourteen times the basic optical thickness.

In an embodiment, the optical thickness of the spacer in the Fabry-Perot resonator, which is most proximal to the substrate, may be four times, six times, eight times, ten times, twelve times, or fourteen times the basic optical thickness.

In an embodiment, the optical thickness of the spacer in the Fabry-Perot resonator, which is most distal to the substrate, may be four times, six times, eight times, ten times, twelve times, or fourteen times the basic optical thickness.

With the structure as described above, it may reduce the stopband of each channel.

DETAILED DESCRIPTION OF THE INVENTION

Figure 1:
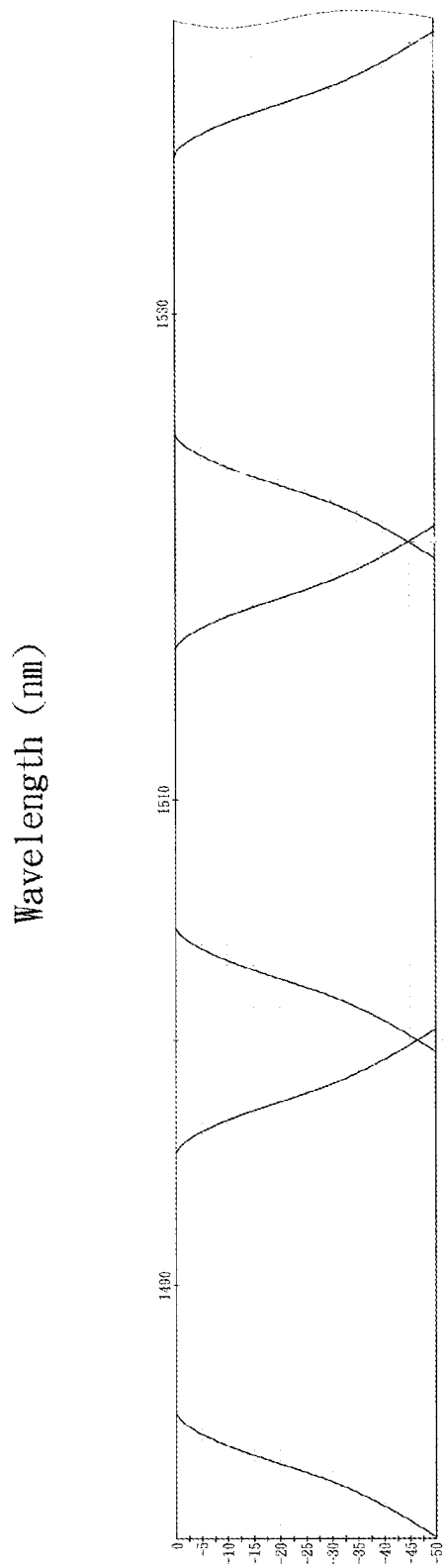
FIG. 1 is a transmittance diagram of the conventional optical filter.
Figure 2:
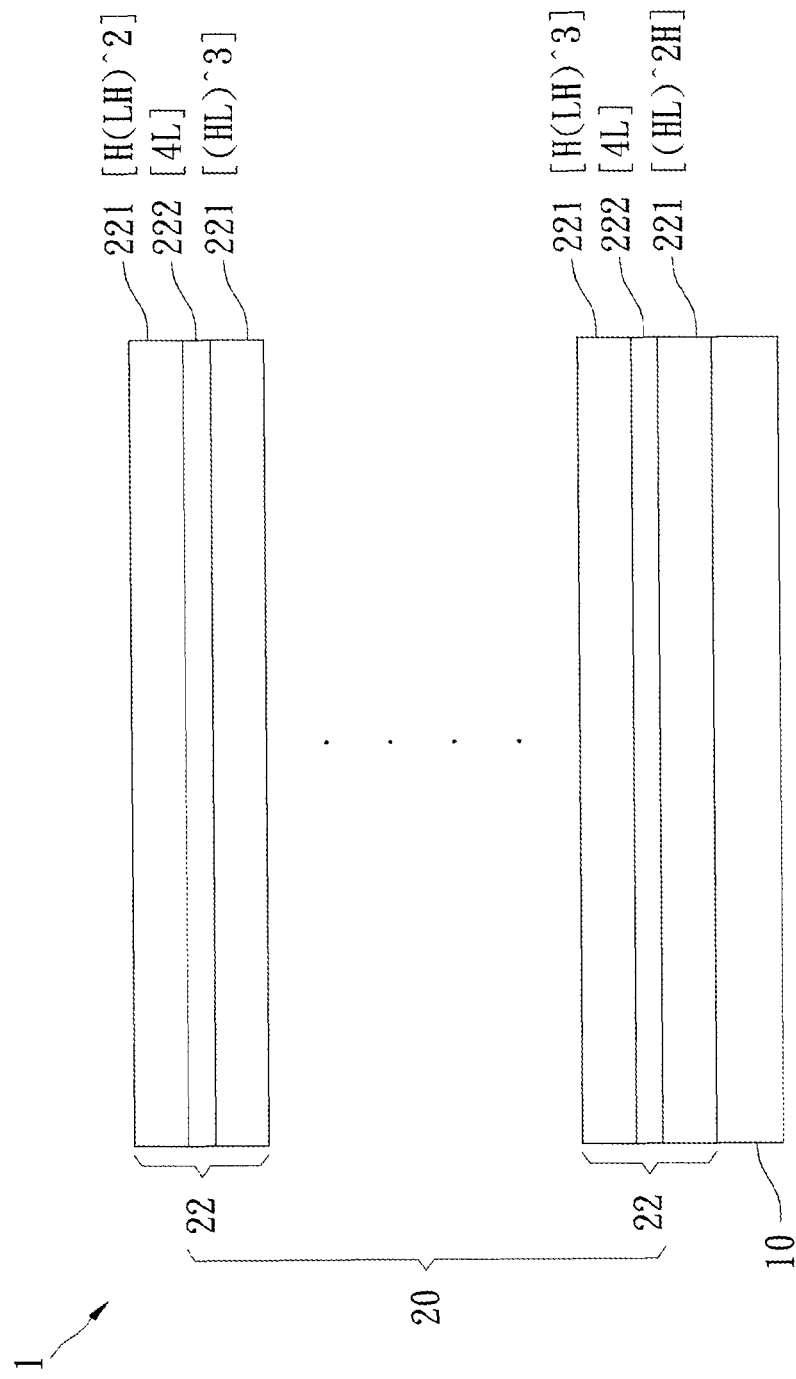
FIG. 2 is s sectional view of the optical filter of a preferred embodiment of the present invention.

As shown in FIG. 2, an optical filter 1 of the preferred embodiment of the present invention, which is used in coarse wavelength division multiplexing (CWDM), includes a substrate 10 and a filter film 20. Hereafter, we take an incident ray with 1,530 nanometers central wavelength for example to disclose the function of the present invention.

The substrate 10 is made of glass, having silica ($SiO_2$), barium (Ba), lithium (Li), sodium (Na), and other elements.

The filter film 20 is attached on the substrate 10 which has nine Fabry-Perot resonators 22, each of which is constructed from alternate layers of high reflective layers and low reflective layers. Each of the high reflective layers and the low reflective layers has a basic optical thickness $\lambda_0/4$ (about 382.5 nanometers). Each Fabry-Perot resonator 22 high reflective layer has two high reflector films 221 and each Fabry-Perot resonator 22 low reflective layer has a low reflective spacer 222 that is positioned between the high reflector films 221, as shown in FIG. 2. The low reflective layers are made of silica with index of refraction in a range between 1.38 and 1.44, and the high reflective layers are made of tantalum oxide with index of refraction in a range between 2.1 and 2.7.F The sequence of the optical filter 20 with nine Fabry-Perot resonators 22 is:

H(LH)^2 4L (HL)^3; H(LH)^3 4L (HL)^3; H(LH)^4 6L (HL)^4; H(LH)^3 6L (HL)^3; H(LH)^4 6L (HL)^4; H(LH)^3 6L (HL)^3; H(LH)^4 6L (HL)^4; H(LH)^3 4L (HL)^3; H(LH)^3 4L (HL)^2 H/Ns wherein: H indicates a high reflective layer with a basic optical thickness ($\lambda_0/4$); L indicates a low reflective layer with a basic optical thickness ($\lambda_0/4$), and Ns indicates the glass substrate.

The character of the optical filter 20 of the present invention is the first Fabry-Perot resonator 22 (H(LH)^2 4L (HL)^3) and the ninth Fabry-Perot resonator 22 (H(LH)^3 4L (HL)^2 H).

In the first Fabry-Perot resonator 22, the high reflector films 221 are H(LH)^2 and (HL)^3, and the spacer 222 is 4L.

In the ninth Fabry-Perot resonator 22, the high reflector films 221 are H(LH)^3 and (HL)^2 H, and the spacer 222 is 4L.

Figure 3:
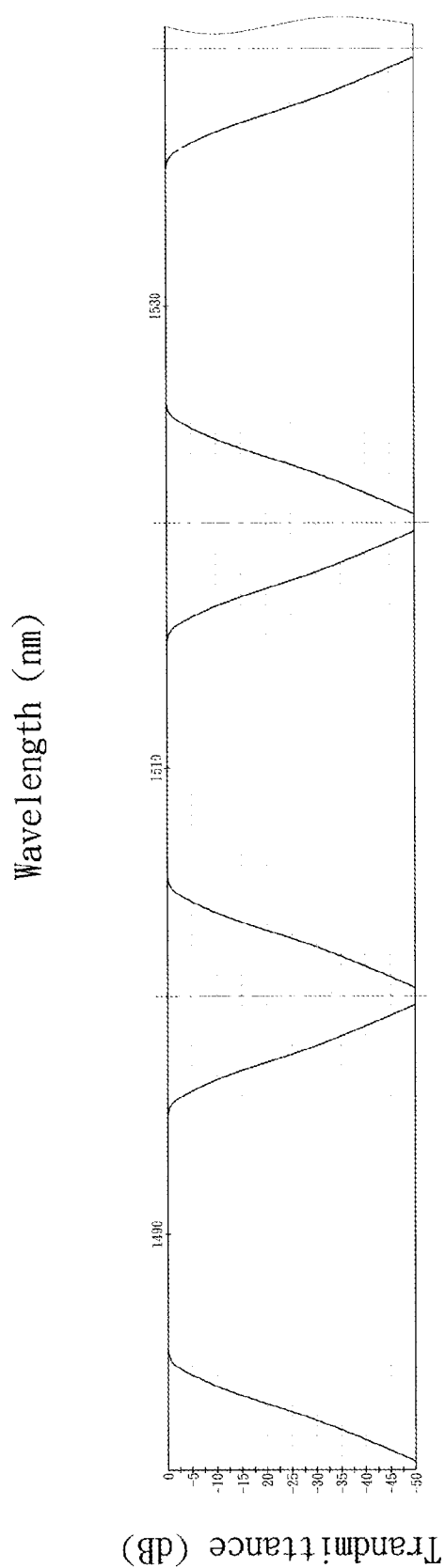
FIG. 3 is a transmittance diagram of the optical filter of the preferred embodiment of the present invention.

As shown in FIG. 3, with the first and ninth Fabry-Perot resonators 22 as described above, the spacers (4L) are formed by low reflective layers with four times (4) the basic optical thickness which may reduce the stopband of each channel and eliminate the interference between the channels to improve the communication quality of optical networking.

It is noted that the spacers in the first Fabry-Perot resonator 22, which is most proximal to the substrate, and in the last Fabry-Perot resonator 22, which is most distal to the substrate, have an optical thickness respectively in a range between four (4) times the basic optical thickness and fourteen (14) times the basic optical thickness. It is preferable that the spacers are six (6) times the basic optical thickness, eight (8) times the basic optical thickness, ten (10) times the basic optical thickness, twelve (12) times the basic optical thickness, or fourteen (14) times the basic optical thickness.

Furthermore, the main character of the present invention is that the spacers in the first and the last Fabry-Perot resonators have great basic optical thickness to reduce the stopband of each channel. The number and the structure of the Fabry-Perot resonators may be various according to the requirement. The description above is a few preferred embodiments of the present invention and the equivalence of the present invention is still in the scope of claim construction of the present invention.

What is claimed is:

1. An optical filter, comprising:
   a substrate;
   a filter film attached on the substrate having alternating layers of high reflective layers and low reflective layers to form a plurality of Fabry-Perot resonators, wherein a basic optical thickness of the high reflective layers and the low reflective layers is one fourth a central wavelength ($\lambda_0/4$) of incident ray, and where each of the Fabry-Perot resonator high reflective layers has two high reflector layer films and
   said low reflective layers have a low reflective layer spacer where said low reflective layer spacers are between the high reflector layer films;
   wherein the low reflective layer spacers in the Fabry-Perot resonator which is most proximal to the substrate, and in the Fabry-Perot resonator which is most distal to the substrate, have an optical thickness respectively in a range between four times the basic optical thickness and fourteen times the basic optical thickness and
   wherein a sequence of the optical filter is:
   H(LH)^2 AL (HL)^3; H(LH)^3 4L (HL)^3; H(LH)^4 6L (HL)^4; H(LH)^3 6L (HL)^3; H(LH)^4 6L (HL)^4; H(LH)^3 6L (HL)^3; H(LH)^4 6L (HL)^4; H(LH)^3 4L (HL)^3; H(LH)^3 BL (HL)^2 H; Ns
   wherein H indicates a high reflective layer with a basic optical thickness ($\lambda_0/4$);
   L indicates a low reflective layer with a basic optical thickness ($\lambda_0/4$);
   Ns indicates the substrate;
   $4 \leq A \leq 14$, and $4 \leq B \leq 14$;
   A indicates times the basic optical thickness of the low reflective layer spacer which is most proximal to the substrate; and
   B indicates times the basic optical thickness of the low reflective layer spacer which is most distal to the substrate.

2. The optical filter as defined in claim 1, wherein the optical thickness of the low reflective layer spacer in the Fabry-Perot resonator which is most proximal to the substrate, is selected from the group consisting of four times the basic optical thickness, six times the basic optical thickness, eight times the basic optical thickness, ten times the basic optical thickness, twelve times the basic optical thickness, and fourteen times the basic optical thickness.

3. The optical filter as defined in claim 2, wherein the optical thickness of the low reflective layer spacer in the Fabry-Perot resonator which is most distal to the substrate, is selected from the group consisting of four times the basic optical thickness, six times the basic optical thickness, eight times the basic optical thickness, ten times the basic optical thickness, twelve times the basic optical thickness, and fourteen times the basic optical thickness.

4. The optical filter as defined in claim 1, wherein the central wavelength of the incident rays is 1530 nanometers.

5. The optical filter as defined in claim 1, wherein an index of refraction of the low reflective layer is in a range between 1.38 and 1.44.

6. The optical filter as defined in claim 5, wherein the low reflective layer spacers are made of silica.

7. The optical filter as defined in claim 1, wherein an index of refraction of the high reflective layer is in a range between 2.1 and 2.7.

8. The optical filter as defined in claim 7, wherein the high reflective layers are made of tantalum oxide.

9. The optical filter as defined in claim 1, wherein the A is selected from the group consisting of 4, 6, 8, 10, 12, and 14, and the B is selected from the group consisting of 4, 6, 8, 10, 12.

* * * * *